May 20, 1969  A. J. BENNETT  3,444,917
FASTENING DEVICE

Filed June 14, 1966  Sheet 1 of 3

INVENTOR.
ALAN JAMES BENNETT
BY
Isaac Isaac & Sammon
ATTORNEYS

May 20, 1969  A. J. BENNETT  3,444,917
FASTENING DEVICE

Filed June 14, 1966  Sheet 2 of 3

INVENTOR.
ALAN JAMES BENNETT
BY
Scare, Scare & Sammon
ATTORNEYS

May 20, 1969     A. J. BENNETT     3,444,917
FASTENING DEVICE

Filed June 14, 1966     Sheet 3 of 3

INVENTOR.
ALAN JAMES BENNETT
BY
*Jeare, Jeare & Sammon*
ATTORNEYS

United States Patent Office 3,444,917
Patented May 20, 1969

3,444,917
FASTENING DEVICE
Alan J. Bennett, Pontypridd, Wales, assignor to Tinnerman Products, Inc., Cleveland, Ohio, a corporation of Ohio
Filed June 14, 1966, Ser. No. 557,422
Claims priority, application Great Britain, June 16, 1965, 25,410/65
Int. Cl. F16b 39/00, 39/24
U.S. Cl. 151—41.76    14 Claims

ABSTRACT OF THE DISCLOSURE

A rotary, fractional turn fastening device made from polymeric material including a head and a nut portion having a bore adapted to be inserted into the opening in a support member and adapted to be secured in place upon insertion of a threaded member through the bore. The head being connected to the nut portion by an intermediate portion adapted to be disposed in the opening in the support member having a plurality of relief surfaces to provide clearance upon rotary turning of the device and a plurality of stop surfaces adapted for abutting engagement with the marginal edges of the opening to limit such rotary turning movement of the device with respect to the support member.

---

This invention relates to fastening devices, and more particularly, the invention relates to a fastening device of the type (hereinafter referred to as of the type described) having a nut portion and a head portion, and designed to be fitted to a panel by insertion of the nut portion through an aperture in the panel from the front side thereof and to be drawn up against the rear surface of the panel by a threaded member, such as a screw, which is inserted into a bore in the nut portion from the front side of the panel, the threaded member tapping a thread in the bore as it is inserted.

According to the present invention there is provided a fastening device of the type described, for fitting into a non-circular aperture in a panel, wherein a portion of the device is of non-circular cross-section, such that after a predetermined limited rotation of the device relative to the aperture, the device cannot be withdrawn through the aperture, and wherein an intermediate portion of the device between said head and said nut is provided with at least one stop surface engageable with a side of the aperture to limit said rotation of the device.

The present invention also provides a fastening device formed in one piece and comprising a nut and a head, said nut being of non-circular cross-section for fitting through a non-circular aperture in a panel, and an intermediate portion between said nut and said head, said intermediate portion being recessed relative to the nut to permit limited rotation of the device relative to the aperture, but having at least one stop surface for preventing rotation of the device beyond a predetermined position in which the non-circular nut is out of register with the non-circular aperture.

These and other features of the present invention will be readily apparent from the following description of several different forms of fastening devices in accordance with the invention. These fastening devices (referred to in the following description as fasteners) are shown in the accompanying drawings in which.

Figure 1:
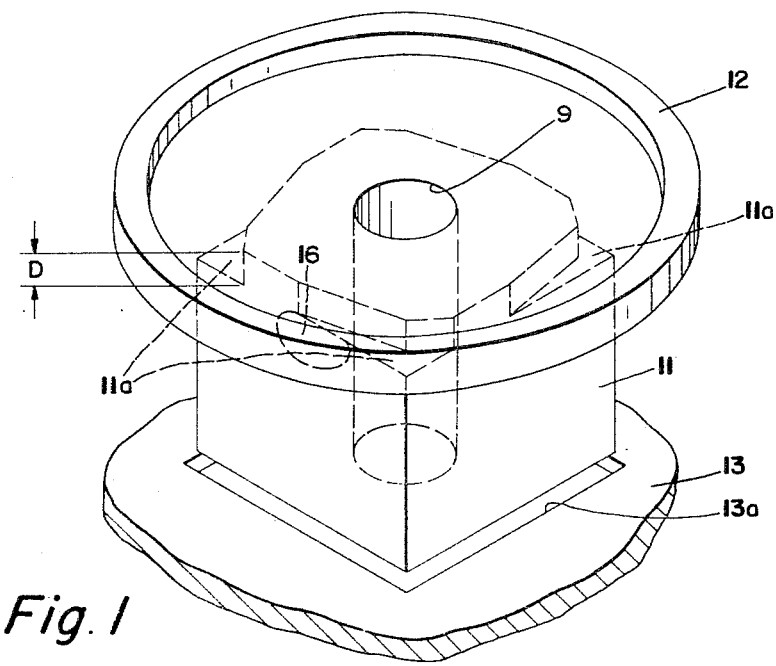
FIG. 1 is a generally perspective view of one form of the fastening device of the invention.
Figure 2:
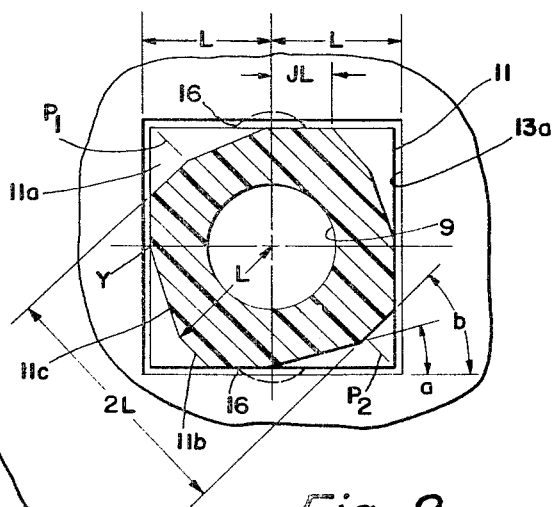
FIG. 2 is an enlarged fragmentary section view through the fastening device taken in the plane of the panel and showing the position of the device relative to the panel upon insertion into the panel.

As shown in FIG. 1, the fastener 10 comprises a nut 11 which may be made integral with a head 12, the latter of which may take the form of a circular flange. The nut 11 of the fastener, as illustrated, may be of square cross-section and can be inserted in an aperture 13a of polygonal shape, such as rectangular or square, in a panel 13. However, to simplify explanation, it will be assumed that the aperture is square. Forms of which are particularly useful for insertion in a rectangular aperture will be considered below.

Preferably, the nut 11 tapers slightly in the direction away from the head 12 to facilitate its insertion into the panel. The portion of the nut 11 immediately below the head 12 may be formed with a recess at each corner of its four corners. The purpose of these recesses is to permit the fastener, after insertion in the panel, to be turned by rotation of threaded member S (FIG. 8), such as a screw, within the bore 9 of the nut to dispose the side faces of the nut at 45° to the sides of the aperture, as shown in FIG. 3.

Figure 3:
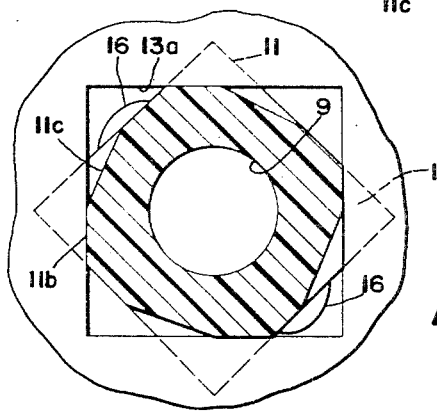
FIG. 3 is a view corresponding to FIG. 2, but showing the device after rotation through an angle of 45° into a locking position.

The shape of the recesses immediately below the head of the fastener is best seen in FIG. 3. Each of these recesses is defined on its upper side by the underside of the head 12, on its lower side by a work engaging surface 11a of the nut 11, and at its inner end by two surfaces parallel to the rotational axis of the fastener. These last two surfaces comprise a stop surface 11b and a relief surface 11c. In this form, there are four sets of stop and relief surfaces. Each stop surface 11b is spaced from the axis of the nut 11 by a distance L substantially equal to half the width of the panel aperture 13a and disposed at an angle (b) of about 45° relative to the adjacent outer edge of the nut 11, and extends from an outer edge of the nut 11 to the diagonal plane $P_1$ or $P_2$ of the nut portion next adjacent thereto in the direction of rotation of the nut. The relief surface 11c on the other hand, extends from the junction of the stop surface 11b with the diagonal plane to the mid point Y of the outer edge of the nut next adjacent thereto in the direction of rotation of the nut at an angle (a) of about 22½°.

Figure 8:
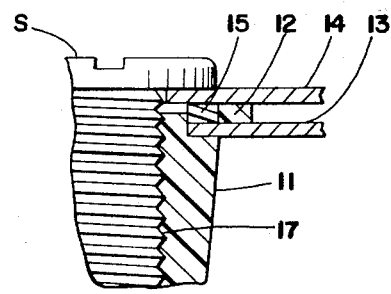
FIG. 8 is an enlarged fragmentary section of a portion of FIG. 7, but after the locking operation has been completed.

Thus upon inserting and rotating the screw S in the bore 9 of the nut 11, the friction therebetween, as the screw taps a thread, as at 17 of FIG. 8, in the bore, causes the nut to turn until the stop surfaces 11b come into engagement with the edges of the panel aperture 13a thus halting further rotation of the nut. In this rotated position, the nut lies 45° out of register with the panel aperture, and withdrawal of the fastener from the panel is prevented by the work-engaging surfaces 11a, as seen in FIG. 3. The bore 9 is unthreaded and preferably has a diameter which is smaller than the diameter of the threaded member S, such as the screw of FIG. 8, to provide such self-threading action.

It will be apreciated that if the relief surfaces 11c where not provided, each stop surface in this event extending in a straight line fully between two adjacent outer edges of the nut, then the force with which the fastener would have to be rotated in order to incise the nut where it fouled the edge of the panel aperture would create a danger of the fastener being turned through more than 45°.

The form of fastener described above can conveniently be made by a molding process, but the formation of the recesses involves the use of mold inserts which are movable into and out of position in a plane normal to the axis of the device, and this type of mold is liable to be expensive.

A simpler molding process can be used if the recesses are formed by mold inserts or projections connected to the mold part which forms the head of the fastener, but in this event apertures will be formed in the head directly above, and corresponding in shape, to the recesses. This results in the formation of four relatively weak junctions between the head and the nut which could result in fracture of the fastener, since the length of each junction is JL (where J is about 0.416 and 2L is the length of a side of the nut 11).

Such fracture would prevent full insertion of the screw into the nut since the nut would be free to rotate with the screw. Such weakness, however, is only of practical significance in the case of a relatively small fastener.

Figure 4:
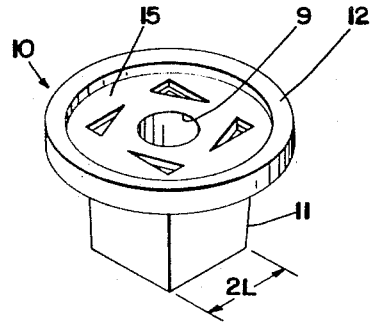
FIG. 4 is a generally perspective view of another form of the fastening device.
Figure 5:
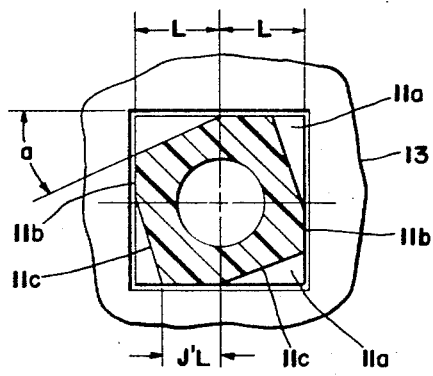
FIGS. 5 and 6 are enlarged fragmentary section views similar to those of FIGS. 2 and 3 in relation to the form of device in FIG. 4.
Figure 6:
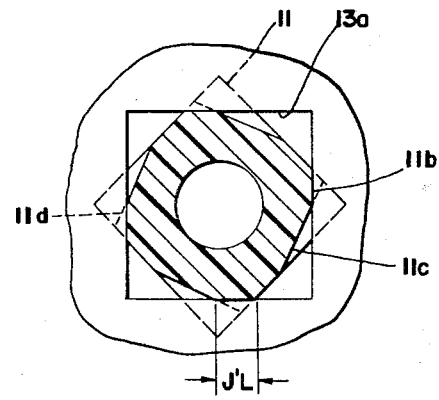

Consequently, for a small fastener, a modification in the shape of the recesses is desirable, which is shown in the modified embodiment of FIGS. 4 to 6. It will be seen, particularly from FIG. 5 that the relief surface 11c has been prolonged to extend fully between adjacent outer edges of the nut, and by so doing each junction has been increased to a length equal to J'L (where J' is about 0.537). When this nut is rotated by the screw, the final part of the 45° rotation results in incision of a cut, as at 11d, to form the stop surface 11b, as shown in FIG. 6.

The depth D (FIG. 1) of the recesses in the nut of both fasteners described above is preferably slightly greater than the thickness of the panel 13 into which the fastener is to be fixed, and slight protrusions 16 may be preferably formed on the side faces of the nut adjacent the recesses so that upon insertion of the fastener into the panel, the nut will be pushed home with a snap action. This feature is also applicable to the further forms of fastener to be described below.

Figure 7:
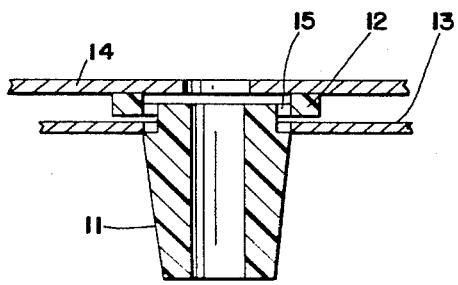
FIG. 7 is a cross-section taken along line 7—7 of FIG. 5, showing the device placed in a panel, and a second panel having been superimposed on the first panel preparatory to locking the second panel to the first panel by insertion of a threaded member into the device.

However, to ensure that the nut is pulled up tight against the panel, when the screw is fully inserted, the head 12 can be formed with a central depression or thickened rim, as shown in FIG. 4, so that the nut 11 is connected to the outer portion of the head by a resilient web 15 which has freedom to deflect in the axial direction, as seen in FIG. 8. Consequently, if the fastener is used to secure together two panels 13 and 14, as shown in FIGS. 7 and 8, as the two panels are pulled tightly together in the final stage of insertion of the screw, the nut will be displaced axially relative to the outer portion or rim of the head 12, with simultaneous flexing of the inner portion or web 15 of the head. It will be evident that although this web is sufficiently thin to permit flexure, it must nevertheless be thick enough to prevent fracture between the head 12 and the nut 11.

Figure 13:
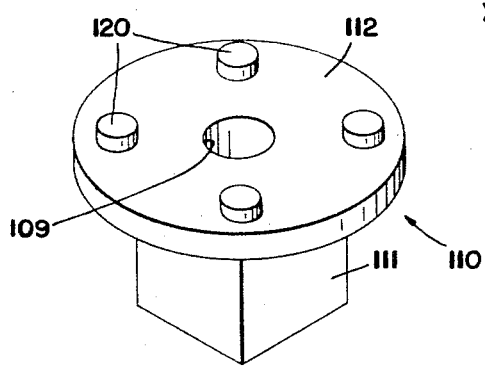
FIG. 13 is a generally perspective view of a further form of the fastening device.

As an alternative to the shape of the head described above, a number of pips 120 may be provided to upstand from the outer portion of the head, as shown in FIG. 13 to serve the same purpose.

Figure 9:
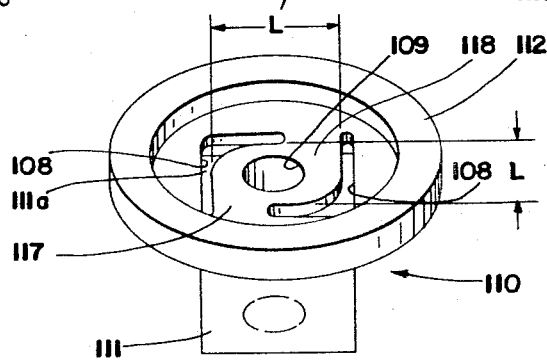
FIG. 9 is a generally perspective view of another form of the fastening device.
Figures 10, 11, 12:
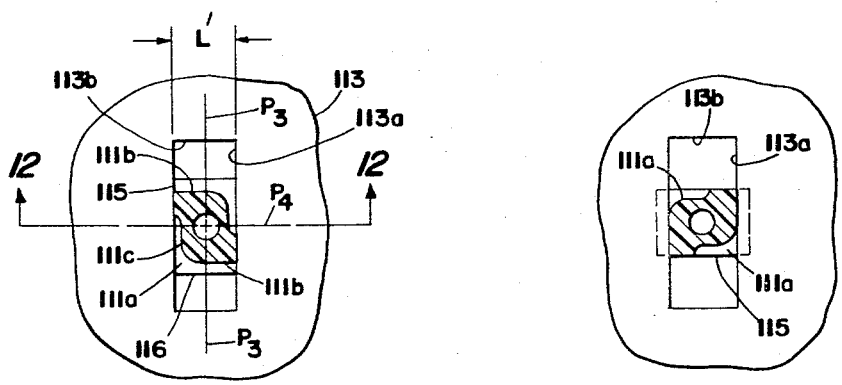
FIG. 10 is an enlarged fragmentary section view through the fastening device of FIG. 9 taken in the plane of the panel and showing the position of the device relative to the panel upon insertion into the panel.
FIG. 11 is a view corresponding to FIG. 10, but showing the device after rotation through an angle 90° into a locking position.
FIG. 12 is an enlarged fragmentary section view taken along line 12—12 of FIG. 10.

A further form of fastener is shown in FIGS. 9 to 12. This form of the fastener 110 may have a nut 111 of rectangular section for insertion in a rectangular aperture or parallel-sided slot 113a in a panel 113, and constructed to be rotated by a threaded member, such as a screw, through 90° into its locking position, so that in this position the longer sides 115 of the nut extend perpendicular to the longer sides 113a of the aperture in the panel, as shown in FIG. 11.

As in the previously-described forms of fastener, the nut of the fastener is formed with recesses immediately below the head 112 of the fastener, but in this case only two recesses are provided, these being located in the minor side faces 116 of the nut.

Although the fastener could be formed by a molding process as used for the fastener of FIG. 1, the illustrated fastener is preferably formed by the process as used for the fastener of FIG. 4. Consequently, each recess is open on its upper side and is defined on its lower side by a work-engaging surface 111a and at its inner end by a stop surface 111b and a relief surface 111c. Each stop surface 111b extends perpendicular to the longer sides 115 of the nut and extends in the direction of rotation of the nut from a said longer side up to the median plane $P_3$ which contains the rotational axis of the nut and is parallel to said longer side. The length of the stop surface is preferably ½L', where L' is the width of the aperture 113a. The relief surface 111c extends from the inner end of the stop surface on the plane $P_3$ to the other median plane $P_4$ which is perpendicular to the longer sides 115 of the nut.

It is desirable that the relief surface 111c, in order to avoid fouling the edge of the panel aperture 113a, preferably must not at any point be spaced more than a distance ½L' from the rotational axis of the fastener. Thus, in this form, it will be a quarter cylindrical surface, arcuate, about the rotational axis of the fastener and having a radius ½L'. However, in order to avoid a sharp edge on the part of the molding tool which forms the recess, the radius of curvature of this surface is preferably reduced as the surface 111c approaches the plane P, as shown in FIG. 10. It will be seen from FIG. 10 that the halves of the nut on opposite sides of the planes $P_3$ and $P_4$ are identical, but turned through 180° relative to one another.

The nut is connected to the head by two junctions 117 and 118 (FIG. 9) each having a length equal to, or in practice slightly less than ½L'.

The head of the nut in both of the last two forms of the fastener described above, can also be provided with a central depression, as shown in FIG. 9 or with upstanding pips 120, as shown in FIG. 13, to enable the nut to be drawn tight up against the underside of the panel, as described before in relation to FIGS. 7 and 8.

All of the fasteners described above can be formed in any one of a large number of materials, but in particular it is constructed to be produced from a polymeric material, such as a synthetic resin plastic, for example nylon.

The terms and expressions which have been used are used as terms of description and not of limitation, and there is no intention in the use of such terms and expressions of excluding any equivalents of any of the features shown, or portions thereof, and it is recognized that various modifications are possible within the scope of the invention.

I claim:

1. A rotary, fractional turn fastening device made from a polymeric material adapted for insertion through a polygonal opening in a support member comprising, a head adapted to be disposed adjacent one side of said support member, a polygonal nut portion extending downwardly from said head adapted for insertion through the opening in said support member, said nut portion having a threadless bore extending therethrough and through said head adapted for receiving in self-threading engagement a threaded member, and a polygonal intermediate portion connecting said head to said nut portion and adapted to be disposed within the opening in said support member, said intermediate portion including at least four outer edge surfaces which constitute extensions of the respective sides of said nut portion, and a corresponding number of recessed portions disposed alternately between said outer edge surfaces and adjacent of the respective corners of said nut portion, said edge surfaces extending generally parallel to the confronting marginal edges of the opening in said support member with generally opposed pairs of said edge surfaces extending generally perpendicular to one another, each recessed portion including an upper surface defined by the corresponding underside of said head and an axially spaced, lower working surface adapted for engagement with the other side of said support member, each recessed portion further including a planar inner relief surface disposed axially between said upper and lower surfaces and which intersects at one end and adjacent one of said edge surfaces adapted to provide clearance for rotary turning of said nut portion about forty-five degrees, a planar inner stop surface disposed axially between said upper and lower surfaces which intersects at one end the other end of said relief surface and at its other end an adjacent one of said edge surfaces adapted for abutting engagement with the confronting marginal edges of the opening in said support member to limit rotary turning movement of said device, said head includes an endless upstanding rim portion spaced radially outwardly from the nut portion for engagement between said support member and another superposed support member, a flexible web connecting said rim portion to said nut portion, said web being connected to said rim portion axially closest to said nut portion, and said web portion having a lesser thickness as compared to the thickness of said rim portion and adapted to provide axial movement of said nut portion in a direction toward said head upon movement of said support members.

2. A rotary, fractional turn fastening device in accordance with claim 1, wherein said relief and stop surfaces are obliquely inclined with respect to one another, and wherein the angle of inclination of said stop surfaces is greater than the angle of inclination of said relief surfaces with respect to the associated edge surfaces of said nut portion.

3. A rotary, fractional turn fastening device in accordance with claim 2, wherein the lengthwise dimension of said intermediate portion is defined by a first plane extending between opposed of said edge surfaces and through the rotational central axis of said device, and wherein the widthwise dimension of said intermediate portion is defined by a second plane extending between opposed of said edge surfaces and through the rotational central axis of said device and generally perpendicular with respect to said first plane.

4. A rotary, fractional turn fastening device in accordance with claim 3, wherein each recessed portion and the corresponding adjacent edge surface which intersects the respective stop surface thereof lies within the quadrant area defined by the intersection of said first and second planes.

5. A rotary, fractional turn fastening device in accordance with claim 4, wherein the juncture of the intersection between each of the respective relief and stop surfaces lies on a third plane which generally diagonally bisects the respective angle defined by said first and second plane.

6. A rotary, fractional turn fastening device in accordance with claim 5, wherein said juncture of intersection is spaced radially from the rotational central axis of said device a distance approximately equal to one-half of the widthwise dimension between respective opposed of said edge surfaces.

7. A rotary, fractional turn fastening device in accordance with claim 6, wherein the length of said stop surfaces is approximately equal to one-half the distance of the radial disposition of the juncture of intersection between respective of the relief and stop surfaces.

8. A rotary, fractional turn fastening device in accordance with claim 3, wherein one opposed pair of said edge surfaces lie on opposite sides of said first plane, and wherein another opposed pair of said edge surfaces lie on opposite sides of said second plane.

9. A rotary, fractional turn fastening device in accordance with claim 1, wherein said nut portion is generally square in cross-section, and wherein said nut portion tapers downwardly and inwardly in a direction away from said head.

10. A rotary, fractional turn fastening device in accordance with claim 1, wherein the axial depth of said recessed portion is greater than the thickness of said support member, and a plurality of protrusions extending laterally outwardly from the sides of said nut portion for snap acting coacting engagement with the confronting marginal edges of the opening in said support member upon insertion of said nut portion therethrough.

11. A rotary, fractional turn fastening device made from a polymeric material adapted for insertion through a polygonal opening in a support member comprising, a head adapted to be disposed adjacent one side of said support member, a polygonal nut portion extending downwardly from said head adapted for insertion through the opening in said support member, said nut portion having a threadless bore extending therethrough and through said head adapted for receiving in self-threading engagement a threaded member, and a polygonal intermediate portion connecting said head to said nut portion and adapted to be disposed within the opening in said support member, said intermediate portion including at least two pair of outer edge surfaces which constitute extensions of the respective sides of said nut portion, and a corresponding number of recessed portions disposed alternately between said outer edge surfaces and adjacent of the respective corners of said nut portion, said edge surfaces extending generally parallel to the confronting marginal edges of the opening said support member with generally opposed pairs of said edge surfaces extending generally perpendicular to one another, each recessed portion including an upper surface defined by the corresponding underside of said head and an axially spaced, lower working surface adapted for engagement with the other side of said support member, each recessed portion further including a planar inner relief surface disposed axially between said upper and lower surfaces and which intersects at one end an adjacent one of said edge surfaces adapted to provide clearance for rotary turning of said nut portion about forty-five degrees, a planar inner stop surface disposed axially between said upper and lower surfaces which intersect at one end the other end of said relief surface and at its other end an adjacent one of said edge surfaces adapted for abutting engagement with the confronting marginal edges of the opening in said support member to limit rotary turning movement of said device, said head including a flexible web portion, said web portion including a thickened portion disposed radially outwardly of said nut portion for engagement between said support member and another superposed support member being adapted to provide axial movement of said nut portion in a direction toward said head upon movement of said support members toward one another.

12. A rotary, fractional turn fastening device in accordance with claim 11, wherein said thickened portion includes an endless upstanding rim portion disposed on the side of said head remote from said nut portion for engagement between said support member and another superposed support member.

13. A rotary, fractional turn fastening device in accordance with claim 11, wherein said thickened portion includes, a plurality of radially spaced, upstanding flexible projections disposed on the side of said head remote from said nut portion.

14. A rotary, fractional turn fastening device made from a polymeric material adapted for insertion through a polygonal opening in a support member comprising, a head adapted to be disposed adjacent one side of said support member, a polygonal nut portion extending downwardly from said head adapted for insertion through the opening in said support member, said nut portion having a polygonal transverse cross section with opposed longer and shorter sides defining a major and minor axis and having a threadless bore extending therethrough adapted for receiving a threaded member in selfthreading engagement therein, a symmetrical irregular shaped intermediate portion connecting said head to said nut portion and adapted to be disposed within the opening in said support member, said intermediate portion including a pair of oppositely disposed edge surfaces which constitute planar extensions of the respective longer sides of said nut portion, said edge surfaces extending generally parallel to the major axis of said nut portion and being disposed entirely on opposed sides of the minor axis of said nut portion and being spaced inwardly of the respective shorter sides of said nut portion, and a pair of oppositely disposed recess portions extending between said edge surfaces generally adjacent diagonally opposed corners of said nut portion, each of said recess portions disposed between the upper confronting side of said head and an axially spaced, lower working surface which is adapted for engagement with the other side of said support member, each recess portion including an inner planar stop surface spaced inwardly from the respective shorter side of said nut portion, each stop surface extending generally parallel to the minor axis of said nut portion and intersecting a respective edge surface at one end thereof adapted for abutting engagement with the confronting edges of the opening in said support member upon 90 degree rotary movement of said device with respect to said support member, and each recess portion further including an inner curved relief surface spaced radially inwardly throughout its length from the respective longer and shorter sides of said nut portion, each relief surface commencing at one end adjacent the juncture of intersection between the major axis of said nut portion and the other end of a respective one of said edge surfaces and terminating at its other end adjacent the minor axis of said nut portion, and each relief surface curving in a direction from said major axis toward said minor axis with the curvature of each relief surface being defined by a quarter of a cylindrical surface generated by the rotation of a radius about the rotational central axis of said device with the radius of curvature progressively reducing in a direction toward said minor axis for providing clearance for said intermediate portion upon turning said device 90 degrees relative to said support member.

References Cited

UNITED STATES PATENTS

| | | | |
|---|---|---|---|
| 2,164,382 | 7/1939 | Burke | 151—41.75 |
| 2,836,216 | 5/1958 | Rapata | 151—41.75 |
| 2,850,064 | 9/1958 | Rapata | 151—7 |
| 2,940,558 | 6/1960 | Schlueter | 85—82 |
| 3,109,342 | 11/1963 | Disley | 151—41.75 |
| 3,110,337 | 11/1963 | Biesocker | 85—80 |
| 3,141,209 | 7/1964 | Van Buren | 151—7 |
| 3,150,703 | 9/1964 | Preziosi | 157—7 |
| 3,186,049 | 6/1965 | Fiddler | 85—80 |
| 3,279,011 | 10/1966 | Flora. | |

EDWARD C. ALLEN, *Primary Examiner.*

U.S. Cl. X.R.

151—7